Patented Feb. 17, 1948

2,436,063

UNITED STATES PATENT OFFICE 2,436,063

SCARLET FEVER TOXIN

John N. Adam, Jr., Montvale, N. J., and Olive Durfee, Pearl River, N. Y., assignors, by mesne assignments, to American Cyanamid Company, New York, N. Y., a corporation of Maine No Drawing. Application June 20, 1945, Serial No. 600,644

6 Claims. (Cl. 167—78)

This invention relates to an improvement in toxins; more particularly in tannic acid precipitated hemolytic streptococcus toxins of the kind which are useful in active immunization against scarlet fever.

During the past few years purified tannic acid precipitated hemolytic streptococcus toxins have come into general use as immunizing agents in the prevention of scarlet fever. The preparation of these erythrogenic toxins is described by M. V. Veldee in Public Health Reports, 53, 909–913 (1938). In general, the toxin is prepared by growing a suitable strain of the scarlet fever organism, such as the N. Y. 5 strain, in a nutrient broth. After maximum toxin production has been attained the broth is filtered through Berkefeld filters and the toxin precipitated with a suitable precipitating agent, such as ammonium sulfate. The erythrogenic toxin is again taken up in saline and then precipitated in the cold by the addition of tannic acid to a concentration of about 0.5%. Excess tannic acid is then removed from the preparation.

The tannic acid precipitated toxin when freshly precipitated is easily dispersed in saline and a uniform suspension can be obtained for injection purposes by merely shaking the bottle. After a few hours, at room temperature, however, it settles out and forms a gummy mass in the bottom of the container which cannot be easily resuspended. This action makes it practically impossible to use the toxin after it has stood for some time.

The tendency of the precipitated toxin to settle out and form a difficulty dispersible gummy mass has been prevented by the addition of small amounts of certain carbohydrate substances, such as gum acacia, gum arabic, pectin, or the like to the toxin suspension. These substances keep the tannic acid precipitate in a flocculent form, even when the suspension is warm.

Unfortunately, the use of carbohydrate gums and the like in flocculating the precipitated toxin is subject to several serious disadvantages, the most important being the tendency of the carbohydrate to hydrolyze, resulting in the formation of acidic substances and a drop in pH of the suspension. As the toxin is not stable, outside a relatively narrow pH range, the carbohydrate treated toxin canont be considered reliable and safe for use after a period of time. It has been necessary, therefore, to keep the toxin stored in an ice box and use it within a period of about six months of its date of manufacture. Naturally, this short dating results in an annoyance to the druggist and a substantial loss to the commercial manufacturer who is usually obliged to accept the returned goods at his own expense.

The use of gums and pectins in suspending the toxin is also disadvantageous in that the product becomes colored and presents an unattractive appearance after a short period of time.

We have discovered that tannic acid precipitated hemolytic streptococcus toxin can be prevented from forming a non-suspendable gummy mass and the product can be kept for a longer period of time, particularly at room temperature, without serious loss of potency, without color formation and without loss of its floccular characteristics, and the readiness with which it may be resuspended. These advantages are attained by forming in the presence of the precipitated suspended toxin an insoluble aluminum hydroxide precipitate in the manner to be hereinafter described.

Toxin of 300,000 skin test doses or more is obtained by growing the standard strain of scarlet fever streptococci in a nutrient broth as described by Veldee in vol. 53 of the Public Health Reports. After sterile filtration to remove organisms the toxin is refined by the addition of ammonium sulfate at the rate of 466 grams per liter of toxin. The precipitated toxin is then collected and made up to the original volume with sterile physiological saline.

To one volume of the refined scarlet fever toxin of 300,000 or more skin test doses per cc. is added an equal volume of sterile physiological saline. All of the manipulations are carried out under aseptic conditions and all of the preparations used are sterile. To the diluted toxin is added one volume of 1% tannic acid solution. This operation is conducted in a cold room at a temperature from about 0° C. to 5° C. The tannic acid precipitated toxin is allowed to settle and the supernatant liquid is syphoned off. The precipitate is then washed with sterile saline until the wash liquor is free of tannic acid. The precipitated and washed toxin is then adjusted to its original volume with physiological saline.

To the purified tannic acid precipitated hemolytic streptococcus toxin is then added $\frac{1}{10}$ volume of a 5% aluminum chloride solution. The pH is then adjusted to within the range 6 to 7, preferably at 6.4, to cause formation of an insoluble flocculent aluminum hydroxide precipitate. The product may then be diluted with saline to desired concentrations for use.

The resulting product will be found to be of a floccular nature and may be readily dispersed by simple shaking. Although the insoluble material will settle out to a slight extent, it will not settle out to such a degree that it cannot be readily redispersed when required for use. Accordingly, the product can remain in a bottle on a shelf for many months and remain ready for instant use.

As a most important characteristic of our new product it is found that the pH remains within the originally adjusted range and stays at these pH values for an indefinite time. There is no acid formation with resulting destruction of toxin as when using pectin, carbohydrate gums, and similar substances, as flocculating agents. Our product is safe and reliable to use, even after standing in its bottle for more than a year. This factor makes it possible to have a longer dating period and minimizes the necessity of returning the material to the manufacturer for its destruction.

It will also be found that our new product has an attractive appearance and does not turn in color with age, as do the products of a similar nature stabilized with carbohydrate substances.

The amount of aluminum hydroxide formed in the presence of the toxin is ordinarily within the range of about 0.25% to 2.0% by weight, based on the weight of the product. The aluminum hydroxide precipitate may be obtained from a variety of sources, most conveniently, one of the aluminum salts, such as aluminum chloride or aluminum sulfate or one of the potassium, sodium or ammonium alums. The precipitating agent is preferably an alkaline material such as sodium hydroxide or sodium carbonate which leaves, after reaction with the aluminum salt, a harmless substance in the preparation. Formation of aluminum hydroxide flocs from these and similar materials is well known and further elaboration on this appears to be unnecessary.

Although aluminum hydroxide has been used as an adsorbing agent for adsorption of toxins in numerous types of bacteriological preparations it will be understood that the present use of aluminum hydroxide is entirely different. Ordinarily, the toxin is adsorbed on the precipitate and, after injection, is slowly desorbed. In the present case, however, it will be noted that the toxin substance is not a simple toxin, but, rather, a tannic acid precipitate thereof, probably a tannic acid salt of the toxin. The scarlet fever toxin itself, which is water-soluble, is not adsorbable on aluminum hydroxide in the usual manner.

We claim:

1. A preparation effective in active immunization against scarlet fever comprising a tannic acid precipitated hemolytic streptococcus toxin and aluminum hydroxide.

2. A preparation effective in active immunization against scarlet fever comprising a tannic acid precipitated hemolytic streptococcus toxin in association with a floccular precipitate of aluminum hydroxide.

3. An immunizing agent comprising an aqueous suspension of tannic acid precipitated hemolytic streptococcus toxin and 0.25% to 2.0% by weight, based on the total weight of the preparation, of an insoluble floccular aluminum hydroxide precipitate, said composition having a pH between 6 and 7.

4. A method of preparing an immunizing agent against scarlet fever which comprises forming a floccular aluminum hydroxide precipitate in the presence of tannic acid precipitated hemolytic streptococcus toxin.

5. A method of preparing an immunizing agent against scarlet fever which comprises mixing together in an aqueous medium tannic acid precipitated hemolytic streptococcus toxin and a soluble, aluminum salt and thereafter forming an insoluble, floccular aluminum hydroxide precipitate therein.

6. A method of preparing an immunizing agent against scarlet fever which comprises treating an aqueous solution containing hemolytic streptococcus toxin with tannic acid to precipitate said toxin, removing excess tannic acid, treating an aqueous suspension of said precipitated toxin with aluminum chloride and, thereafter, adjusting the pH of the preparation to within 6 to 7 to obtain an insoluble, floccular aluminum hydroxide precipitate in association with said precipitated hemolytic streptococcus toxin.

JOHN N. ADAM, Jr.
OLIVE DURFEE.

REFERENCES CITED

The following references are of record in the file of this patent:

UNITED STATES PATENTS

| Number | Name | Date |
|---|---|---|
| 1,057,673 | Sames | Apr. 1, 1913 |
| 2,151,364 | Winegarden | Mar. 21, 1939 |

OTHER REFERENCES

Public Health Reports, June 3, 1938, Tannic Acid Precipitation of Scarlet Fever Toxin by M. V. Veldee, pages 909 to 913.

The Absorption of Scarlet Fever Toxin on Aluminum Hydroxide by F. Farago in Z. Immunitats, 92,220 (1938), #2/3-abstracted in Squibb Abstract Bulletin, vol. 11, March 16, 1938, page 496. (Copy of S. A. B. in Div. 43.)